United States Patent

[11] 3,549,903

| [72] | Inventor | John R. Lowdenslager<br>Ossining, N.Y. |
|---|---|---|
| [21] | Appl. No. | 730,082 |
| [22] | Filed | May 17, 1968 |
| [45] | Patented | Dec. 22, 1970 |
| [73] | Assignee | Singer-General Precision, Inc.<br>a corporation of Delaware |

[54] VARIABLE RESISTANCE AND LOW PASS FILTER CIRCUIT
3 Claims, 7 Drawing Figs.

[52] U.S. Cl................................................. 307/237,
307/229, 307/233, 307/240, 307/251, 307/265;
328/127
[51] Int. Cl....................................................... H03k 5/08
[50] Field of Search........................................ 307/237,
240, 233, 251, 271, 295, 229, 265; 328/127, 129,
138; 332/56; 330/9

[56] References Cited
UNITED STATES PATENTS

| 3,129,326 | 4/1964 | Balaban...................... | 307/229X |
| 3,249,925 | 5/1966 | Single et al. ................ | 328/127X |
| 3,296,520 | 1/1967 | Griffith....................... | 307/237X |
| 3,482,113 | 12/1969 | Heesh........................ | 307/229 |

*Primary Examiner*—Stanley T. Krawczewicz
*Attorney*—Sal A. Giarratana

ABSTRACT: A fixed resistor having a selected potential applied thereacross is alternately switched into and out of the input circuit of an operational amplifier at an invariant rate. By varying the percentage of time during which the switch is closed the average flow of electrical charge, i.e., current, though the resistor is varied and the effective resistance of the resistor is made inversely proportional to the percentage of the switch closing time or the duty cycle thereof. The switch closing time or duty cycle is determined by a control voltage and the resistor whose effective resistance is thus determined may be included in a low pass filter circuit to provide an electronically variable filter.

PATENTED DEC 22 1970  3,549,903

VARIABLE RESISTANCE AND LOW PASS FILTER CIRCUIT

DESCRIPTION OF THE INVENTION

It is frequently desirable to incorporate resistors whose resistances may be varied by known amounts into electronics circuits such as filters, delay circuits and the like. When potentiometers and other mechanical elements are used problems of accuracy and nonlinearity are encountered which leave much to be desired.

In the present system the amount of resistance which is to be incorporated is determined accurately and linearly by purely electronic means avoiding the use of mechanical errors and the like. This is accomplished by varying the percentage of time during which a fixed resistor is permitted to have a current flowing therethrough which in turn in effect varies the effective value of resistance of the fixed resistor element.

An object of the invention, therefore, is to provide a nonmechanical circuit for varying the effective resistance of a resistor which is at once both accurate and linear over the range of control.

A further object is to provide an inexpensive nonmechanical filter incorporating such an electronically varied resistor.

The invention will be more fully understood from the following description taken with the drawings in which.

Figure 1:
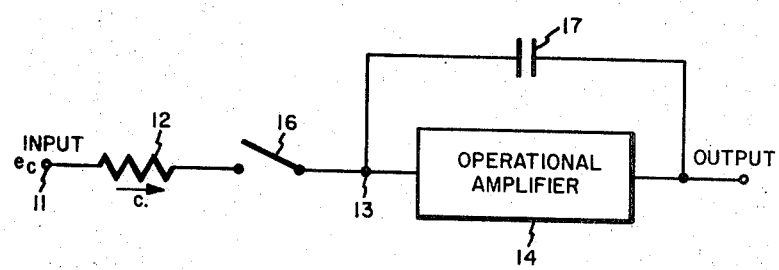
FIG. 1 is a simplified schematic diagram explaining the operation of the invention.

Referring now to FIG. 1, an input terminal 11 has a control voltage $e_c$ imposed thereon and produces a current flow in the resistor 12. The resistor 12 is connected to the input 13 of an operational amplifier 14 through a switch 16. The operational amplifier is shunted by the capacitor 17 and, as is well known, such an amplifier has a very high input impedance so that the input thereof is kept at a null. The current flowing through the resistor 12 will be proportional to the potential $e_c$ applied to the input and inversely proportional to the resistance R of the resistor. If, however, the switch 16 is opened and closed at a constant-operating frequency, the current flow through the resistor 12 averaged or integrated over a finite period of time, relatively long compared to the cycle of the operation of the switch, will vary in accordance with the time period the switch is closed compared to the total time taken for one switch cycle of operation. That is, the shorter the period of time during which the switch is closed during each complete cycle, the less the average current. Since the equivalent resistance (R equiv.) of the resistor 12 is inversely proportional to the current flowing through it, the circuit of FIG. 1 may be thought of as incorporating a variable resistor whose value is inversely proportional to the percentage of time the switch is closed, that is the "duty cycle" of the switch.

Figure 2:
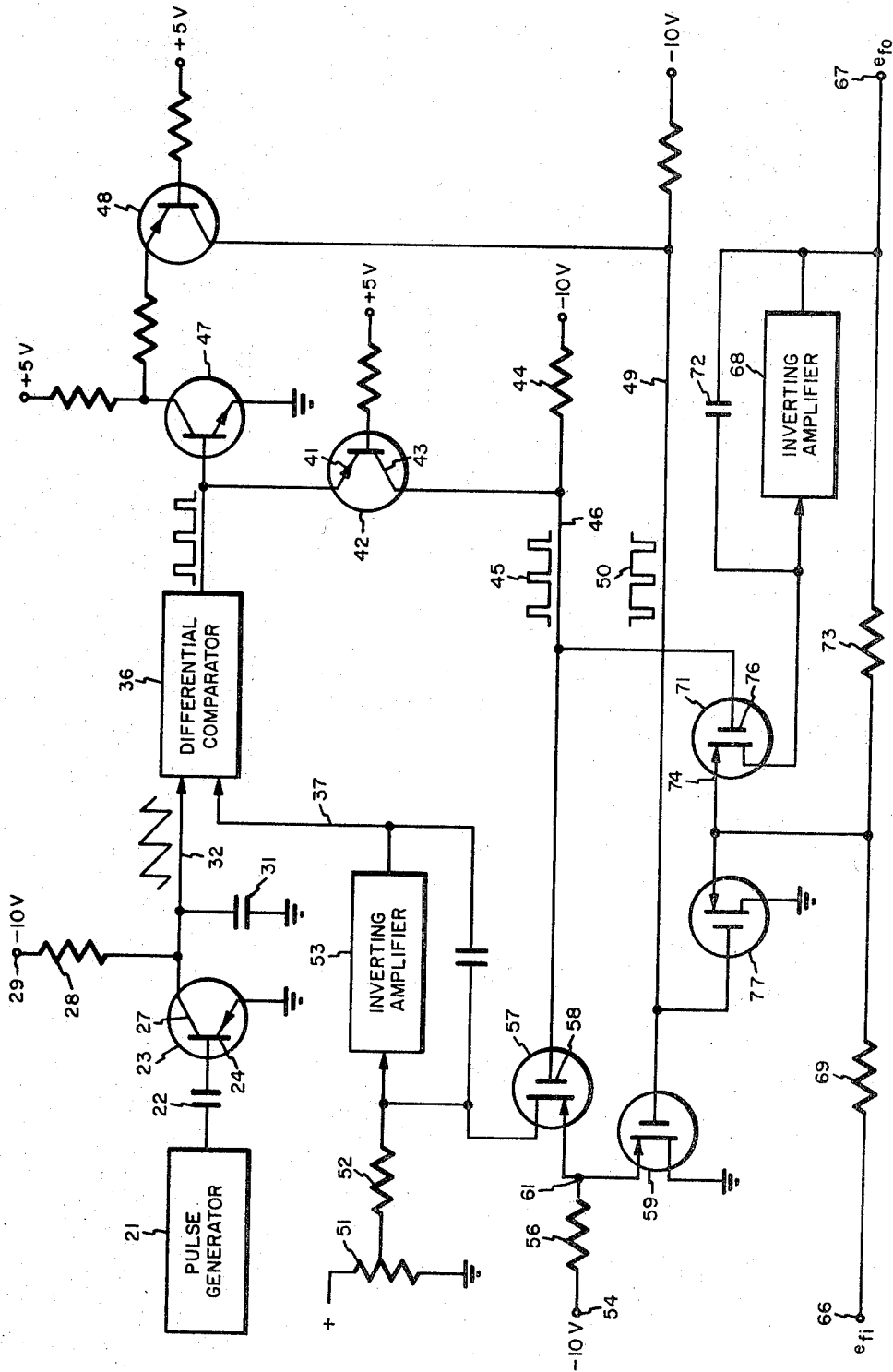
FIG. 2 is a schematic diagram illustrating the invention as used in a low pass filter and the control-switching circuit.

Turning now to FIG. 2, there is therein disclosed in schematic and block form a circuit for applying varying duty cycle current to resistors; generating control signals for various switching circuits and an arrangement utilizing the effective resistance of a resistor capacitor circuit for providing a variable low pass filter.

Figure 3A:
FIGS. 3A to 3D are waveforms used to explain the operation of the control circuit.

A pulse generator 21 generates pulses at a selected frequency of, for example 20 KH$_z$ and these pulses are sharpened by being applied through a coupling capacitor 22 to the base 24 of a transistor 23 as illustrated by the waveform of FIG. 3A. The collector 27 is connected through a resistor 28 to a source of negative potential 29 of say −10 volts and to ground through a capacitor 31. During the occurence of a pulse signal such as 26 the transistor 23 is made conductive and the capacitor 31 is rapidly discharged so that the conductor 32 rapidly attains a potential of zero volts as illustrated at 33 of the waveform of FIG. 3B.

Figure 3B:
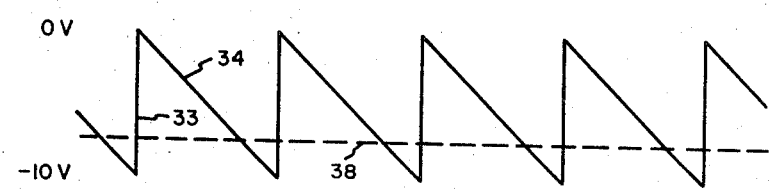

During the interpulse period the transistor 23 is nonconductive and the capacitor 31 is linearly charged from the source 29 through the resistor 28 as illustrated at 34 of FIG. 3B. Thus a sawtooth waveform having limits between zero and −10 volts is generated and applied as one input to the differential comparator 36. This differential comparator may be of the type known as the Fairchild μ710 which produces an output signal when, and only when, the signal level on conductor 32 is equal to or more negative than the signal level on input conductor 37.

Figure 3C:
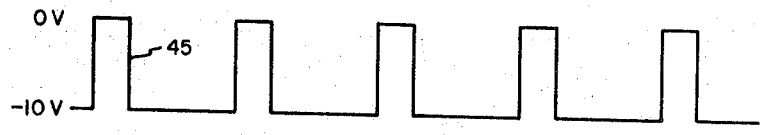

Assuming for the present time that the signal level on conductor 37 is that indicated by the broken line 38 of FIG. 3B, the output of the comparator 36 is a waveform such as illustrated in FIG. 3C. The output of the comparator 36 is impressed on the emitter 41 of the switch transistor 42 whose collector 43 is connected to a source of −10 volts through a resistor 44 so that a waveform signal 45 such as illustrated in FIG. 3C varying between zero and −10 volts is imposed on conductor 46.

Figure 3D:
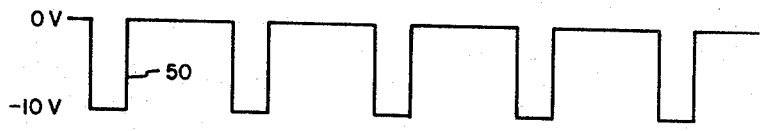

At the same time the output of the comparator 36 is impressed on the inverting transistor 47 and in turn on a second switch transistor 48 operating similarly to transistor 42 so a reverse waveform signal 50 as illustrated in FIG. 3D is imposed on conductor 49.

These two waveform signals 45 and 50 act to control the switching circuits in a manner presently to be described to control the time during which current is permitted to flow through a fixed resistor to vary the effective resistance thereof.

The source of the control voltage for operating the circuit is represented as a potentiometer 51 for the sake of simplicity although it is to be recognized that it may be a direct current control voltage obtained from a source such as a Doppler navigator frequency tracker such as disclosed in U.S. Pat. No. 3,121,202. This control voltage is impressed through resistor 52 on the input of an operational amplifier 53 similar in operation to the amplifier 14 of FIG. 1. A second input for the amplifier 53 is derived from a fixed voltage source through resistor 56 and the source-drain path of a metalic oxide semiconductor field effect transistor (MOS FET) 57. The signal waveform 45 is applied to the gate electrode 58 of the MOS FET 57 so that the MOS FET 57 acts as a closed switch when the gate electrode 58 is at −10 volts and as an open switch when the gate electrode is at zero volts.

As a precautionary measure, a second MOS FET switch 59 is connected between the terminal 61 and ground. This MOS FET has the inverse waveform 50 applied to its gate electrode so that is is in open circuit condition when MOS FET 57 is closed and vice versa. In this manner the potential across the source-drain path of MOS FET 57 is prevented from rising to any appreciable value during its nonconductive period.

Because the amplifier 53 is an operational amplifier, its input is maintained at null and the current flowing into the input through the resistor 52 must equal the current flowing out of the input through the MOS FET switch 57 and the resistor 56 and the following relations obtain:

$$R_1 \text{ (equiv.)} = \frac{R_1}{\text{Duty cycle}} \quad (1)$$

where $R_1$ is the fixed resistance of resistor 56 and $R_1$ (equiv.) is the effective resistance produced as heretofore pointed out by the switching of the resistor 56 into and out of circuit.

Considering −10 volts applied to terminal 54 and the voltage $E_c$ as applied through a resistance $R_2$ of resistor 52

$$\frac{10}{R_1 \text{ (equiv)}} = \frac{E_c}{R_2} \quad (2)$$

and $$R_1 \text{ (equiv)} = \frac{10 R_2}{E_c} \quad (3)$$

That is the equivalent resistance of resistor 56 is made inversely proportional to the applied control voltage.

Briefly stated the closed loop operates to produce such a time average of current through the resistor 56 as to balance the current flow through the resistor 52 setting the output of the operation amplifiers at such a voltage level as to operate the switch 57 on a duty cycle to produce this average current.

It might seem at first glance that the circuit involves an overcomplication in that the duty cycle could be controlled by introducing the control voltage $E_c$ directly to input conductor 37 of differential comparitor 36. However, when, as will appear hereinafter, similar MOS FET switches are used to vary the equivalent resistance of resistors in a low pass filter circuit, the entire circuit is made more linear as the delay in all MOS FET switches is the same.

Turning now to the filter portion of the circuit, a signal $e_{fi}$ is applied to an input terminal 66 and it is desired to impose on the output terminal 67 a signal $e_{fo}$ which is a controllable lower band portion of the signal $e_{fi}$. In other words, referring to FIG. 4 it is desired to transmit from input to output only those signal frequencies $\omega$ which are below the frequency $\omega o$, defined as the cutoff frequency arbitrarily taken as the point at which the signal is 3 db. down from its maximum value.

The input signal $e_{fi}$ is applied to the input of an inverting amplifier 68 through a resistor 69 and the source-drain path of a MOS FET 71. A capacitor 72 shunts the operational amplifier 68 and a resistor 73 is connected between the output of the operational amplifier and the source electrode 74 of the MOS FET 71. The gate electrode 76 of the MOS FET 71 has the switching signal 45 applied thereto so that the MOS FET 71 is rendered conductive in timed relation to MOS FET 57. MOS FET 77 has the switch signal 50 applied to its gate electrode and like MOS FET 59 acts as a protective device to insure that the source electrode 74 of MOS FET 71 does not rise to an excessive voltage during the interpulse period.

It will be now apparent that the current flow through both resistors is controlled by the MOS FET 71 and that the average current and hence the effective resistance of both of these resistors is inversely proportional to the duty cycle as heretofore defined.

Figure 4:
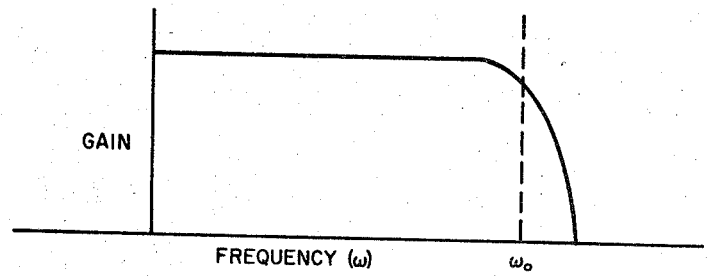
FIG. 4 is illustrative of the characteristic of the low pass filter.

The characteristic of the filter as illustrated in FIG. 4 may be expressed by the equation:

$$\left|\frac{E_{f_o}}{E_{f_i}}\right| = \frac{R_4}{R_3} \frac{1}{\sqrt{1+\frac{\omega^2}{\omega_o^2}}} \quad (4)$$

where $R_4$ is the resistance of resistor 73, $R_3$ is the resistance of resistor 69, and $\omega o$ is the cutoff frequency. Sine.

$$\omega_o = \frac{\text{Duty Cycle}}{R_4 C} \quad (5)$$

wherein C is the capacity of the capacitor 72. It will be apparent therefore that the band pass characteristic of the filter may be varied linearly with respect to the control potential derived from the source 51.

While MOS FETS have been disclosed as constituting the switching circuits for the circuit herein disclosed, it will be apparent to one skilled in the art that other equivalent electronic-switching devices may be used.

I claim:

1. The circuit combination, comprising:
a first operational amplifier having a pair of input branches, one of said input branches including a first fixed resistance having a randomly varying DC control potential impressed thereon, the other of said branches including a series connected source of current, a second fixed resistance, and a first electronic-switch means, said switch means being adapted to close in response to a constant frequency varying pulse width modulated signal to thereby vary the average current through said last mentioned resistance and hence, the effective value thereof;

means for producing a sawtooth wave signal;

differential comparator means responsive to said operational amplifier output and said sawtooth wave signal for producing therefrom said constant frequency variable pulse width modulated signal wherein the latter's instantaneous pulse width is related to the difference in amplitude between the output of said operational amplifier and said sawtooth wave signal;

feedback connection means between the output of said differential amplifier and said first electronic-switch means whereby said constant frequency variable pulse width modulated signal automatically controls the duty cycle of said first electronic-switch means to vary the effective resistance in said other branch input of said operational amplifier in response to variations in said varying DC control potential and to thereby maintain the sum of the inputs to said amplifier at null;

a second operational amplifier having a spectral frequency AC signal applied to its input network, said input network comprising a third fixed resistance in series with a second electronic switch means;

a fourth fixed resistance connected between the output of said second amplifier and a junction between said second electronic switch means and said third fixed resistance; and a feed-forward connection between said differential comparator output and said second electronic-switch means whereby the constant frequency variable pulse width modulated signal impressed thereon varies the effective resistance of said third resistance in accordance with the variation in said DC control potential, said variation in the effective resistance of said third resistance being effective to vary the band pass characteristic of said second operational amplifier.

2. The combination defined in claim 1 further comprising:
means responsive to the output of said differential comparator for producing a signal whose waveform is the inverse of said first-mentioned constant frequency variable pulse width modulated signal;

a third electronic switch means having one of its terminals connected between said second fixed resistance and said first electronic switch means and having the other of its terminals connected to ground; and means for coupling the output of said inverse signal producing means to said third electronic switch means.

3. The combination defined in claim 1 further comprising:
means responsive to the output of said differential comparator for producing a signal whose waveform is the inverse of said first-mentioned constant frequency variable pulse width modulated signal;

a third electronic switch means having one of its terminals connected to said junction and the other of its terminals connected to ground; and means for coupling the output of said inverse signal producing means to said third switch means.